Figure 1:
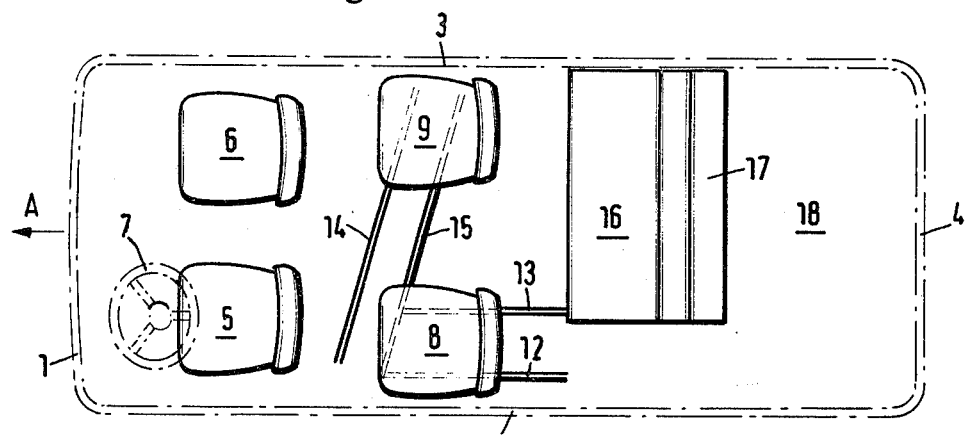

United States Patent [19]

Braun et al.

[11] 4,341,415
[45] Jul. 27, 1982

[54] VEHICLE HAVING AT LEAST TWO ROWS OF TANDEM SEATS

[75] Inventors: Dieter Braun; Peter-Michael Hübner, both of Rheda-Wiedenbrück, Fed. Rep. of Germany

[73] Assignee: Westfalia-Werke Franz Knöbel & Söhne KG, Rheda-Wiedenbrück, Fed. Rep. of Germany

[21] Appl. No.: 105,879

[22] Filed: Dec. 21, 1979

[30] Foreign Application Priority Data

Dec. 23, 1978 [DE] Fed. Rep. of Germany ... 7838370[U]

[51] Int. Cl.³ .............................................. B60N 1/08
[52] U.S. Cl. ................................... 296/65 R; 296/69; 297/257
[58] Field of Search ........... 297/257, 240, 241, 122 R; 244/118.6, 118.5; 280/801; 296/65 R, 64, 65 A, 69

[56] References Cited

U.S. PATENT DOCUMENTS

| | | | |
|---|---|---|---|
| 3,394,964 | 7/1968 | Humphries et al. | 297/240 |
| 3,427,042 | 2/1969 | Roper | 280/801 |
| 4,150,843 | 4/1979 | Reid et al. | 280/801 |
| 4,157,797 | 6/1979 | Fox | 296/65 R X |

OTHER PUBLICATIONS

"James Cook", Westfalia Publication 2822.11, Nov. 1978.
"Sven Hedin", Westfalia Publication 2/73.11, Sep. 1978.
"Camping-Einrictungen", Westfalia Publication 2160.12, May, 1978.

*Primary Examiner*—David M. Mitchell
*Assistant Examiner*—Norman L. Stack, Jr.
*Attorney, Agent, or Firm*—Charles E. Baxley

[57] ABSTRACT

This invention is directed to a vehicle structure that provides for flexible seat rearrangement capability in which the second of two rows of tandem, rotatable seats are mounted on rails. The rails for one of the second rows of seats are parallel with the longitudinal axis of the vehicle. The rails for the other of the second row seats extend across the vehicle at an angle of about 60° to the vehicle's longitudinal axis. These angularly disposed rails, moreover, extend to the front of the longitudinal rails.

7 Claims, 9 Drawing Figures

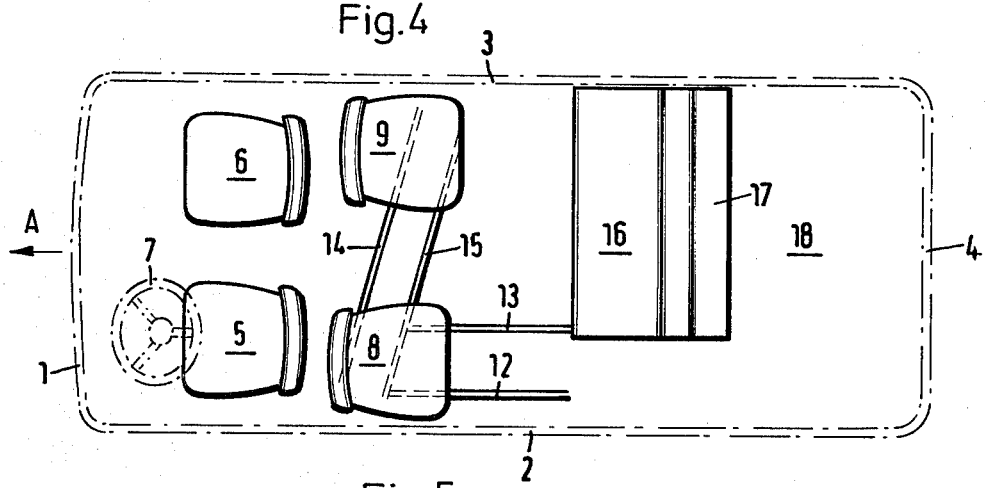
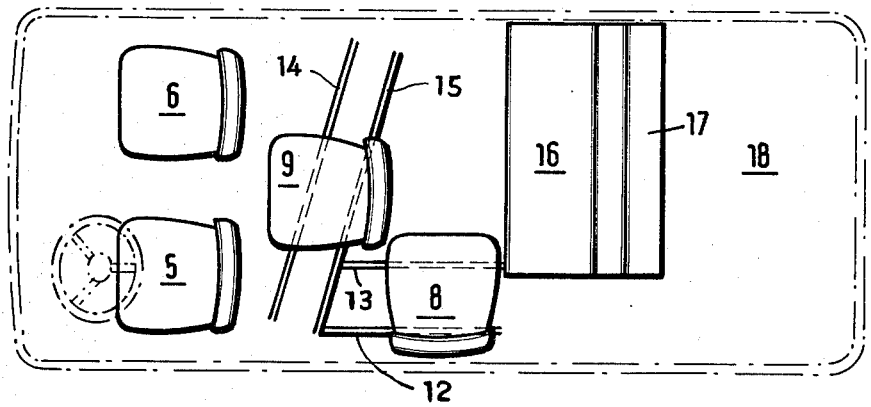
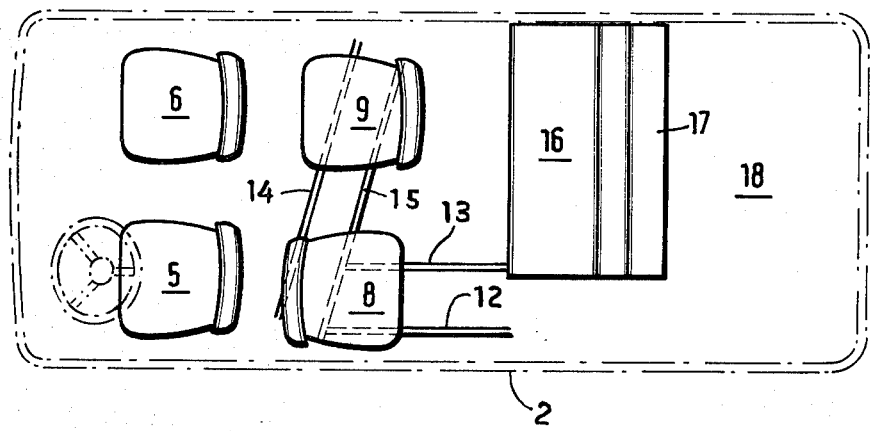

U.S. Patent   Jul. 27, 1982   Sheet 3 of 3   4,341,415
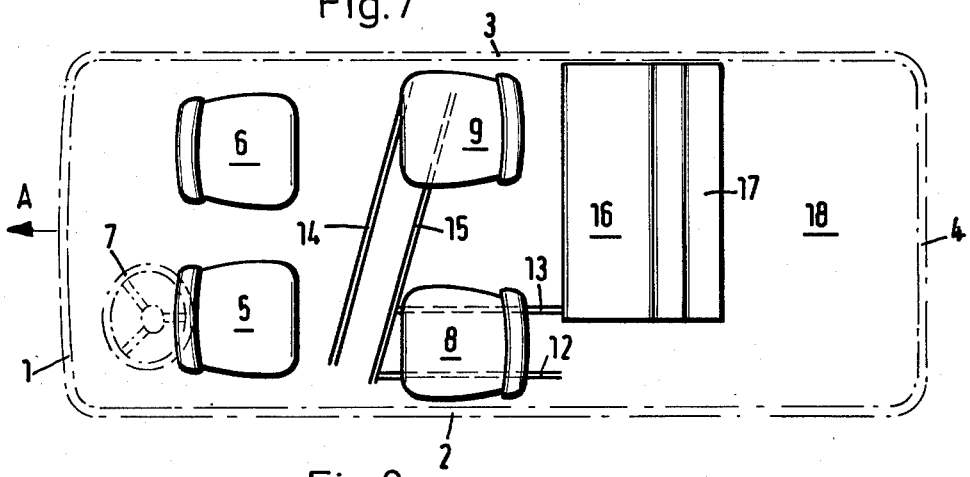
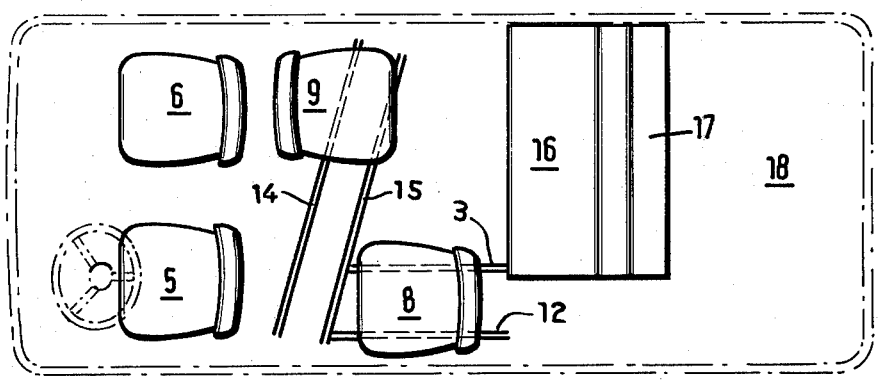
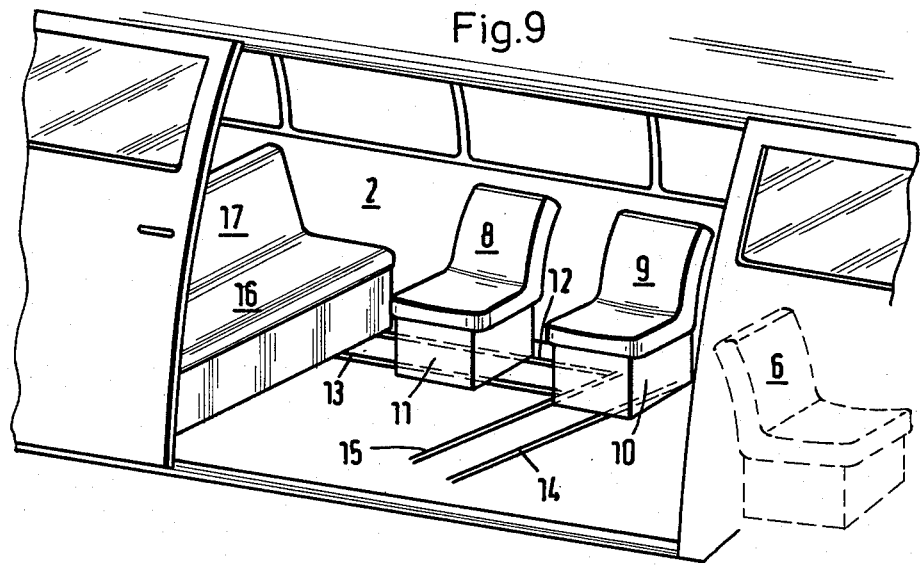

VEHICLE HAVING AT LEAST TWO ROWS OF TANDEM SEATS

The present invention refers to vehicles, or the like having at least two rows of seats arranged in tandem and, more particularly, to individual vehicle seats in which the seats of the second and further rows are movable on rails that are recessed in the floor, and the like.

Vehicles of the type in question, are e.g. automobiles, minibuses and motor-homes often having seats which are arranged alongside each other in a row. These seats can be moved individually in the direction of the lengthwise axis of the vehicle, or moved as benches on rails that are recessed in the floor. This movement is permitted to improve the comfort of the passengers by making available more leg room. In the case of motor-homes, moreover, benches which are displaceable in the vehicle's longitudinal direction effect a conversion through which two benches, arranged one behind the other in the direction of vehicle travel, can be converted in such a manner that, displaced and swung over opposite to each other with a table-top between, they produce a dinette. Individual automobile seats that are rotatable about their respective vertical axes so that they can be adjusted to face in the direction of travel, the direction opposite the direction of travel or transverse to the direction of travel also are known.

It is an object of the invention to provide a vehicle in which two rows of seats, and preferably at least three rows of seats, are arranged in tandem. This arrangement includes the seats for the driver and the passenger sitting alongside the driver and in which the seats can be shifted and displaced for the most varied purposes. Illustratively, shifting and displacing the seats for living accommodations as well as for business negotiations, discussions, or even official functions in which several persons are to participate in a given seating arrangement, can be carried out.

In order to achieve this purpose, a vehicle of the type in question is characterized by the fact that the rails for the seats on one side of the vehicle for the second and any further rows extend in the direction of the vehicle's longitudinal axis. The rails for the seat on the other side of the vehicle, however, extend at an angle of about 60° relative to the vehicle's longitudinal axis. These angularly disposed rails are oriented from a rear position that is near to the front end of the other seat's longitudinally extending rails to a front position that is in front of the front end of the longitudinally extending rails. The first row, seats, namely the seat for the driver and the passenger alongside the driver, both are preferably rotatable through 180°. The seats in the second and in any subsequent rows, moreover, are supported on bases that have not only a rail translation device but also are rotatable through 180°. All of the rotatable seats are preferably provided with a detent position for a 90° turn. All of these rotatable seats also are preferably provided with a short, lockable, longitudinal translation adjustment on the turntable directly below the respective seat. Further, the seats in the first row are advisedly provided with three-point belts and the seats in the other rows are provided with waist belts. A typical seat belt arrangement is shown in U.S. Pat. No. 3,427,042. The third row of seats also may consist of a bench that can be swung into a horizontal position by means of a conventional mechanism.

Through this special seat development, and particularly the opportunity for seat translation and the arrangement of the rails for seats in the second and subsequent rows (if any), enjoy the option of being arranged in very different groupings to allow the space in the vehicle to be utilized in the most varied manner.

The invention will be described in further detail below on the basis of an example, read in conjunction with the drawings in which:

FIGS. 1 to 8 are plan views of a schematic floor plan for a vehicle, in which the direction of travel is indicated by the arrow A at the left front side; and FIG. 9 is a partial perspective view of the vehicle with the side door open.

FIG. 1 is a plan view of a vehicle showing the seats in basic travel position. The direction of travel of the vehicle is indicated by the arrow A and, accordingly, the vehicle has the front side 1, the two side walls 2 and 3, and the rear side 4. In the case of such vehicles, in general in addition to a door for the driver and the passenger sitting alongside of him there is provided on the right-hand side of the vehicle (and therefore on the side 3) another door, that is either a double door or a sliding door. The doors have not been shown in detail since they are not essential to an understanding of the invention. In the vehicle there is provided, first of all, a driver's seat 5. Alongside the driver's seat 5 in the first row is a passenger's seat 6. The driver's seat 5, moreover, is located behind the steering wheel 7. Both the driver's seat 5 and the passenger's seat 6 are equipped to rotate 180° about respective vertical axes to permit the driver or the passenger to sit either facing in the direction of travel or with the back towards the direction of travel.

A detent position also can be for the turning or swiveling means at 90° to permit the seats 5 and 6 to be swung and locked with the seat backs, for instance, facing the respective side walls 2 and 3.

Between the turning or swiveling means and the seat proper there is also provided a short adjustable longitudinal translation structure associated with each of the turntables for the seats 5 and 6. This translation structure may comprise, for instance, two rails (not shown) arranged below the sides of the respective seat on which the seat can be pushed forward and back. Frequently such translation structure rails are formed to rise towards the front of the vehicle. Thus, as the seat is pushed forward its surface is raised to adjust to the height of the passenger.

In the second row of seats, two individual seats 8 and 9 are arranged alongside of each other. These seats are advisedly placed on box-like bases 10 and 11 (FIG. 9). Turning or swiveling means, such as described in connection with the first row with the seats 5 and 6, is installed between the box 10 or 11 and the respective seats 9 and 8. In this way the seats 8 and 9 can be turned 180° or else 90° about their respective vertical axes and locked in position.

The box-like bases 10 and 11 also are translatable by means of slide members on rails. Such a translation devices for seats is shown in U.S. Pat. No. 4,157,797.

Rails are recessed in the floor of the vehicle. For the seat 8 (FIG. 1) two parallel rails 12 and 13 are mounted parallel to the longitudinal axis of the vehicle. The lengths of the rails 12 and 13 is sufficient to enable the seat 8 to be displaceable by an amount at least equal to its entire depth of the seat 8 in the longitudinal direction of the vehicle.

The adjacent seat 9 is also fastened and translatable by means of rails through slide pieces in the seat base. These rails 14 and 15 extend at an angle of about 60° to the longitudinal axis of the vehicle from a rear position near the front end of the longitudinally extending rails 12 and 13 to a front position before the forward end of the longitudinally extending rails 12 and 13. Consequently, the rails 14 and 15 extend approximately over the entire width of the vehicle and are arranged somewhat obliquely.

In the case of the embodiment of the invention herein described, the third row of seats consists of a bench 16 which is provided, in a known manner, with its back 17. The back 17 has hinge fittings to enable it to be simply swung down to form a bed, in a conventional manner. When employed as bed, the seat surface 16 and the back 17 lie in the same horizontal plane and form a continuous horizontal surface with the rear surface 18, which is advisedly also upholstered, as shown in FIG. 2.

By means of the slide pieces below the base boxes 11 and 10, the seats 8 and 9, respectively, are translatable on the two pairs of rails 12, 13 and 14, 15. These seats each can be locked at any desired point on the rails. In another embodiment of the invention, behind the second row of seats comprising the seats 8 and 9 within a vehicle additional rows of seats can be mounted. The seats in these additional rows also are longitudinally and obliquely translatable on suitably arranged rails in exactly the same manner as the second row with the seats 8 and 9 described above.

Figure 2:
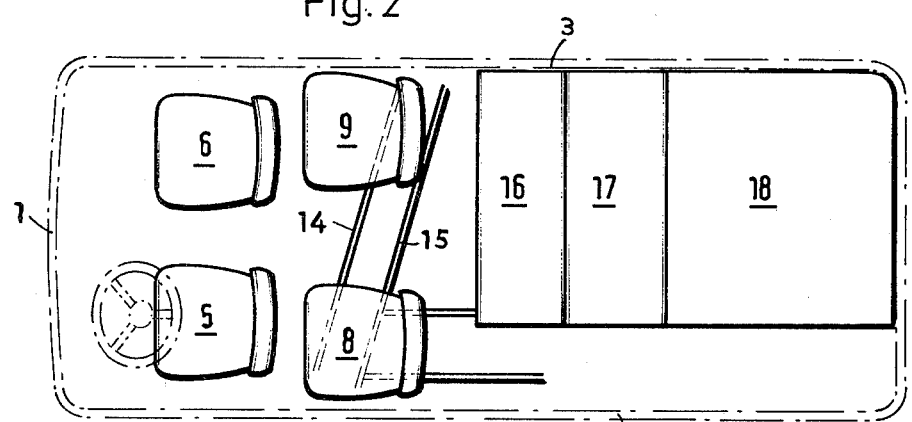

FIG. 2 shows a first modified adjustment of the seats. The seats 8 and 9 of the second row have been shifted longitudinally into the far forward position on their short rails that were hereinbefore described as mounted on top of the respective seat swivel means. As shown in FIG. 2 the seats 8 and 9 are moved as close as possible to the front seats 5 and 6. This configuration establishes a possibility for a third row of seats (or the convertible bench) to be changed into a bed. Thus, the seat surface 16 together with the back 17 is swung into a horizontal plane and forms a continuous lying surface with a surface 18, that also is suitably upholstered, and which is located behind the back 17.

Figure 3:
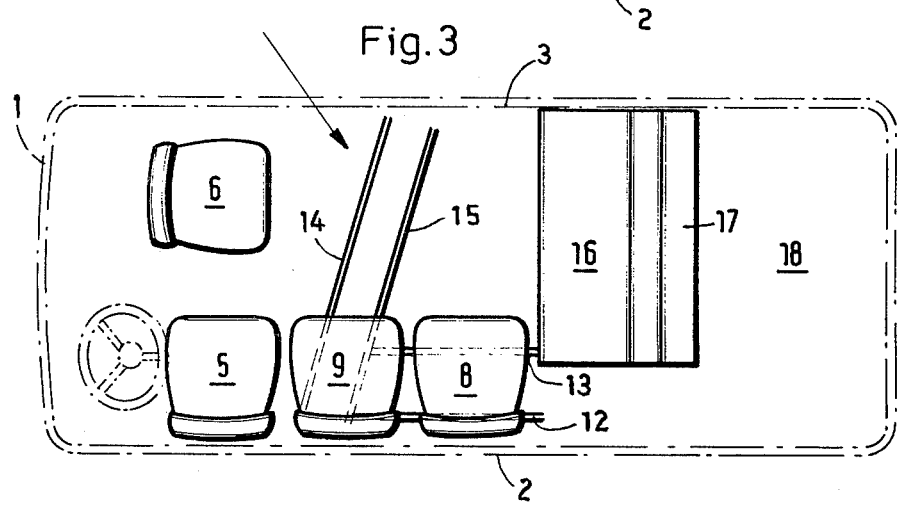

FIG. 3 shows another seating arrangement. In this case all of the seats in the vehicle have been arranged to form a large sitting group. The driver's seat 5 is swung 90° to the longitudinal axis of the vehicle so that his back faces the outer wall 2. The seat at the right front 6 has been swung 180° so that its back faces the front wall 1 in direction of travel. In the second row of seats, the seat 8 on the left-hand side has been pushed as far back as possible on its rails 12, 13 and turned by means of its swivel device through 90° to permit its back to face the outer wall 2. The seat 9 on the right-hand side of the second row has been pushed on the rails 14, 15 that extend obliquely across the entire width of the vehicle, to the other side of the vehicle. The seat 9 also is swung 90° on its base to enable the back of the seat to face the vehicle wall 2. In this manner, the seat 9 is lodged between the seats 5 and 8 and together with these seats forms a continuous row of three seats. With the seat bench 16 forming a right angle with the orientation of the seat 8, all four seats form a large sitting group of U-shape which can be grouped, for instance, around a table arranged in the center. It should be noted, that it is possible for all persons on the seats and on the benches to evacuate the vehicle rapidly, because the large door in the vehicle wall 3 is not blocked through this seating arrangement.

In the case of the arrangement shown in FIG. 4, the driver's seat 5 and the front right seat 6 are left in the orientation shown in FIG. 1, while the second row seats are changed. The seat 8 is pushed all the way forward on its rails which extend parallel to the longitudinal axis of the vehicle. The seat 8 then is rotated 180° upon its swivel to permit its back to be directly behind the back of the driver's seat 5. In addition, the seat is pushed further in direction of travel on its short translation device that is mounted on top of the seat's swivel disk (not shown). In the same way, the adjacent seat 9 is turned 180° on its base and the seat is pushed forward in direction of vehicle travel on its short longitudinal translation device to enable its back to lie directly behind the rear of the back of the front right-hand seat 6. In this way, a small seating group is produced in which the seats 8 and 9, as individual seats, are opposite the bench 16 and a smaller table can then also be placed between these two opposite rows of seats. The possibility for an unimpeded evacuation of the vehicle through the large door in the wall 3 is still present. Furthermore, there is also a provision for a passageway to the driver's seat or to the seat on the front right side. This arrangement, with a small sitting group, may be used in travel.

In FIG. 5 there is shown another seating arrangement. In this case, the seat 9 has been pushed somewhat to the center of the vehicle and translated some distance forward on the rails 14 and 15 which are arranged obliquely and which extend across the width of the vehicle. The seat 9 can also be further shifted forward on its short translation device so that it is staggered behind the two seats 5 and 6 of the first row. This position provides leg space, and a wide angle of view in the direction of vehicle travel. A configuration of this nature is advantageous, for instance, for patrol cars. With this orientation for the seat 9, if the seat 8 on the left-hand side of the second row is shifted somewhat towards the rear on its rails 12, 13 (which extend parallel to the longitudinal axis of the vehicle) the seat 8 can be swung 90° to form a right angle with the bench 16 to facilitate communication with the passengers seated there.

In accordance with FIG. 6, the two seats of the first row, namely the driver's seat 5 and the front right seat 6, are arranged in the direction of travel. The seat 9 of the second row is also placed in the original direction of travel while the seat 8 behind the driver's seat has been pushed as far as possible forward on the rails 12, 13 and swung 180° so that it is opposite the bench 16 and can be in communication with the bench. This arrangement can also be used while the vehicle is traveling. As can be noted in the drawings, room is still available alongside the bench 16 and the outer wall 2 of the vehicle. This space can be utilized for a cooking device. A radio also can be built in to this space to permit the radio to be operated both by the person sitting to the left on the bench 16 and also from the seat 8 which has been swung towards the rear, as shown FIG. 6.

In accordance with FIG. 7 the two seats in the front row of seats, the driver's seat 5 and the front right-hand seat 6, are swung 180° to face towards the rear, of the vehicle. The two seats in the second row of seats, the seat 8 and the seat 9, are pushed towards the rear of the vehicle and form a small seating group of four seats with the two front seats.

In accordance with FIG. 8, the driver's seat 5 and front right seat 6 are in the driving position, while in the second row the seat 8 has been pushed to approximately the center of its longitudinally extending rails 12 and 13 and faces in direction of travel. The adjoining seat 9, however, has been swung 180° so that it is facing opposite to the direction of travel. The adjoining seat 9, however, has been swung 180° so that it is facing opposite to the direction of travel. The seat 9 also is displaced on its small longitudinal translation device as far as possible in the direction towards the front right-hand seat 6 so that it is opposite the bench 16 and is in communication with it. This arrangement can also be used during travel.

FIG. 9 shows a partial perspective view, seen through the open sliding door of the vehicle, with an arrangement of the seats corresponding approximately to FIG. 3, the front right seat 6 being oriented to face in the direction of travel. The fact that a space which can be used for built-in objects is also present between the bench 16 and the outer wall 2 is not clearly illustrated in this figure.

We claim:

1. A vehicle having a floor comprising at least two rows of individual seats arranged one behind the other, the seats in each row being on opposite sides of the vehicle, at least two rails recessed in the floor for the second row of seats, at least one of said rails extending parallel with the longitudinal axis of the vehicle for the seat on one side of the vehicle, the other of the rails for the seat on the other side of the vehicle extending at an angle of about 60° to the longitudinal axis of the vehicle from a rearward position near one end of the longitudinally extending rails to a position in front of that end of the longitudinally extending rails, the bases of the seats of the second row having respective individual translation devices and means for swiveling each of said seats through 180°.

2. A vehicle according to claim 1, wherein the seats in the first row further comprise means for swiveling 180°.

3. A vehicle according to claim 2 wherein all of the swivel seats each further comprise respective 90° rotation detents.

4. A vehicle according to claim 1 wherein all of the swivel seats each further comprise respective short lockable longitudinal translation devices.

5. A vehicle according to claim 1 wherein the seats of the first row further comprise three-point belts while the seats of the second row are provided with waist belts.

6. A vehicle according to claim 1, further comprising a third row of seats in which the seats are a bench which can be swung over to form a bed.

7. A vehicle having a floor comprising at least two rows of individual seats arranged one behind the other, the seats in each row being an opposite sides of the vehicle, each of said seats having a respective base for rail translation, at least two rails recessed in the floor for the second row of seats, at least one of the said rails extending parallel with the longitudinal axis of the vehicle for the seat on one side of the vehicle, the other of the rails for the seat on the other side of the vehicle extending at an angle of about 60° to the longitudinal axis of the vehicle from a rearward position near one end of the longitudinally extending rail to a position in front of that end of the longitudinally extending rails.

* * * * *